United States Patent
Wigard et al.

(10) Patent No.: US 11,950,206 B2
(45) Date of Patent: Apr. 2, 2024

(54) PAGING ON NARROW BEAM AND ALIGNMENT WITH DEFAULT DRX

(71) Applicant: Nokia Technologies Oy, Espoo (FI)

(72) Inventors: Jeroen Wigard, Klarup (DK); Mads Lauridsen, Gistrup (DK); Kim Nielsen, Storvorde (DK); István Z. Kovács, Aalborg (DK); Jens Steiner, Klarup (DK); Rafhael Amorim, Aalborg (DK); Nuno K. Pratas, Gistrup (DK)

(73) Assignee: NOKIA TECHNOLOGIES OY, Espoo (FI)

(*) Notice: Subject to any disclaimer, the term of this patent is extended or adjusted under 35 U.S.C. 154(b) by 396 days.

(21) Appl. No.: 17/604,917

(22) PCT Filed: Apr. 17, 2020

(86) PCT No.: PCT/IB2020/053681
§ 371 (c)(1),
(2) Date: Oct. 19, 2021

(87) PCT Pub. No.: WO2020/222070
PCT Pub. Date: Nov. 5, 2020

(65) Prior Publication Data
US 2022/0225270 A1   Jul. 14, 2022

Related U.S. Application Data

(60) Provisional application No. 62/840,545, filed on Apr. 30, 2019.

(51) Int. Cl.
*H04W 68/02* (2009.01)
*H04W 52/02* (2009.01)

(52) U.S. Cl.
CPC ....... *H04W 68/02* (2013.01); *H04W 52/0229* (2013.01)

(58) Field of Classification Search
CPC ... H04W 68/00; H04W 68/005; H04W 68/02; H04W 52/0229; H04W 76/20;
(Continued)

(56) References Cited

U.S. PATENT DOCUMENTS

| 5,852,630 A * | 12/1998 | Langberg | H04L 27/2647 375/219 |
| 11,229,003 B2 * | 1/2022 | Shih | H04W 56/001 |

(Continued)

FOREIGN PATENT DOCUMENTS

| WO | 2019/047958 A1 | 3/2019 |
| WO | 2019/064236 A2 | 4/2019 |

OTHER PUBLICATIONS

"Paging mechanism for beam sweeping operation", 3GPP TSG-RAN WG2 #97, R2-1701840, Agenda: 10.2.2.6, HTC, Feb. 13-17, 2017, pp. 1-2.
(Continued)

*Primary Examiner* — Siu M Lee
(74) *Attorney, Agent, or Firm* — Robert P. Michal, Esq.; Carter, DeLuca & Farrell LLP (57) ABSTRACT

In accordance with an example embodiment of the present invention, a method comprising: receiving from a network node, by a user equipment of a plurality of user equipment associated with more than one communication beam of a communication network, information comprising locations in time of the user equipment during paging occasions with at least one cell of the communication network associated over more than one communication beam, wherein the information identifies any provided order of the more than one communication beam covering the locations in time of the user equipment during the paging occasions; and based on the information, identifying by the user equipment at least one communication beam and timing of at least one
(Continued)

paging occasion, of the paging occasions, for the user equipment.

17 Claims, 6 Drawing Sheets

(58) Field of Classification Search
CPC .. H04W 76/28; H04W 64/00; H04B 7/18545; H04B 7/18547; H04B 7/18563
See application file for complete search history.

(56) References Cited

U.S. PATENT DOCUMENTS

| | | | |
|---|---|---|---|
| 11,856,518 B2* | 12/2023 | Kwon | H04B 7/088 |
| 2021/0329562 A1* | 10/2021 | Yu | H04W 52/028 |
| 2021/0385785 A1* | 12/2021 | Lee | H04W 72/23 |

OTHER PUBLICATIONS

"Paging Design", 3GPP TSG RAN WG1 Meeting #89, R1-1707931, Agenda: 7.1.1.3, Samsung, May 15-19, 2017, pp. 1-3.

"Remaining details on NR paging design", 3GPP TSG RAN WG1 Meeting #90bis, R1-1717462, Agenda: 7.1.3, vivo, Oct. 9-13, 2017, pp. 1-5.

"Paging in NR", 3GPP TSG-RAN WG2 NR, R2-1700016, Agenda: 3.2.2.6, Samsung, Jan. 17-19, 2017, 5 pages.

Weng et al., "Efficient Beam Sweeping Paging in Millimeter Wave 5G Networks", IEEE International Conference on Communications Workshops (ICC Workshops), May 20-24, 2018, 6 pages.

"3rd Generation Partnership Project; Technical Specification Group Radio Access Network; NR; User Equipment (UE) procedures in Idle mode and RRC Inactive state (Release 15)", 3GPF TS 38.304, V15.3.0 , Mar. 2019, pp. 1-29.

International Search Report and Written Opinion received for corresponding Patent Cooperation Treaty Application No. PCT/IB2020/053681, dated Jul. 6, 2020, 10 pages.

"3rd Generation Partnership Project; Technical Specification Group Radio Access Network; Solutions for NR to support non-terrestrial networks (NTN) (Release 16)", 3GPP TR 38.821, V0.4.0, Mar. 2019, pp. 1-46.

"3rd Generation Partnership Project; Technical Specification Group Radio Access Network; Study on New Radio (NR) to support non terrestrial networks (Release 15)", 3GPP TR 38.811, V1.0.0, Jun. 2018, pp. 1-136.

* cited by examiner

PAGING ON NARROW BEAM AND ALIGNMENT WITH DEFAULT DRX

RELATED APPLICATION

This application claims priority to PCT Application No. PCT/IB2020/053681 filed Apr. 17, 2020, which claims priority to U.S. Application No. 62/840545 filed Apr. 30, 2019, each of which is incorporated herein by reference in its entirety.

TECHNICAL FIELD

The teachings in accordance with the exemplary embodiments of this invention relate generally to paging on narrow beam and alignment with a default discontinuous reception of network devices and, more specifically, relate to providing network devices operating over more than one communication beam information of paging occasion for the alignment with a default discontinuous reception of the network devices.

BACKGROUND

This section is intended to provide a background or context to example embodiments of the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
DRX discontinuous reception
eNB base station
MME mobility management entity
P-RNTI paging radio network temporary identifier
PDCCH physical downlink control channel
PF paging frame
PO paging occasion
RRC radio resource control
SIB system information block
UE user equipment At the time of this application 3GPP is studying how to enable non-terrestrial networks (NTN) using New Radio (NR). Some of this effort is detailed in 3GPP TR 38.821 (Solutions for NR to support non-terrestrial networks) in which a focus includes how to provide coverage everywhere on the globe. At the time of this application multiple architecture solutions are under study for the 3 satellite categories; Geostationary Earth Orbit (GEO), Low-Earth Orbit (LEO), and High-Altitude Platform Systems (HAPS).

Example embodiments of this invention work to improve paging and discontinuous reception (DRX) to improve at least these operations associated with such New Radio network implementations.

SUMMARY

Various aspects of examples of the invention are set out in the claims.

According to a first aspect of the present invention, a method comprising: determining, by a network node of a communication network, information comprising locations in time of a user equipment of a plurality of user equipment during paging occasions associated with at least one cell of the communication network over more than one communication beam, wherein the information identifies any provided order of the more than one communication beam covering the locations in time of the user equipment during the paging occasions; and sending the information towards the user equipment for use by the user equipment to identify with the information at least one communication beam and timing of at least one paging occasion, of the paging occasions, for the user equipment.

According to a second aspect of the present invention, an apparatus comprising: at least one processor; and at least one memory including computer program code, wherein the at least one memory and the computer program code are configured, with the at least one processor, to cause the apparatus to at least: determine information comprising locations in time of a user equipment of a plurality of user equipment during paging occasions associated with at least one cell of a communication network over more than one communication beam, wherein the information identifies any provided order of the more than one communication beam covering the locations in time of the user equipment during the paging occasions; and send the information towards the user equipment for use by the user equipment to identify with the information at least one communication beam and timing of at least one paging occasion, of the paging occasions, for the user equipment.

According to a third aspect of the present invention, A non-transitory computer storage medium encoded with a computer program, the program comprising instructions that when executed by one or more computers cause the one or more computers to perform operations comprising: determining, by a network node of a communication network, information comprising locations in time of a user equipment of a plurality of user equipment during paging occasions associated with at least one cell of the communication network over more than one communication beam, wherein the information identifies any provided order of the more than one communication beam covering the locations in time of the user equipment during the paging occasions; and sending the information towards the user equipment for use by the user equipment to identify with the information at least one communication beam and timing of at least one paging occasion, of the paging occasions, for the user equipment.

According to a fourth aspect of the present invention, a method comprising: receiving from a network node, by a user equipment of a plurality of user equipment associated with more than one communication beam of a communication network, information comprising locations in time of the user equipment during paging occasions with at least one cell of the communication network associated over more than one communication beam, wherein the information identifies any provided order of the more than one communication beam covering the locations in time of the user equipment during the paging occasions; and based on the information, identifying by the user equipment at least one communication beam and timing of at least one paging occasion, of the paging occasions, for the user equipment.

According to a fifth aspect of the present invention, an apparatus comprising: at least one processor; and at least one memory including computer program code, wherein the at least one memory and the computer program code are configured, with the at least one processor, to cause the apparatus to at least: receive from a network node, by the apparatus of a plurality of user equipment associated with more than one communication beam of a communication network, information comprising locations in time of the apparatus during paging occasions with at least one cell of the communication network associated over more than one communication beam, wherein the information identifies any provided order of the more than one communication beam covering the locations in time of the apparatus during the paging occasions; and based on the information, identifying by the apparatus at least one communication beam and timing of at least one paging occasion of the paging occasions.

According to a sixth aspect of the present invention, A non-transitory computer storage medium encoded with a computer program, the program comprising instructions that when executed by one or more computers cause the one or more computers to perform operations comprising: receiving from a network node, by a user equipment of a plurality of user equipment associated with more than one communication beam of a communication network, information comprising locations in time of the user equipment during paging occasions with at least one cell of the communication network associated over more than one communication beam, wherein the information identifies any provided order of the more than one communication beam covering the locations in time of the user equipment during the paging occasions; and based on the information, identifying by the user equipment at least one communication beam and timing of at least one paging occasion, of the paging occasions, for the user equipment.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of this invention, there is provided at least one novel design for providing network devices operating over more than one communication beam information of paging occasion for alignment with discontinuous reception operations of the network devices.

As similarly stated above 3GPP is studying how to enable non-terrestrial networks (NTN) using New Radio (NR). The work is detailed in the study item TR 38.821 (Solutions for NR to support non-terrestrial networks) and focusses on how to provide coverage everywhere on the globe.

Certain example embodiments of this invention are written in the context of Non Terrestrial Networks (NTN), but can be more generally applied. However, the use case of NTN can be more attractive as:

Link Budget is challenging for NTN, as the distance between base station and UE is very large (see 38.811); and Power savings at the UE are rather important, as NTN are typically used in environments where power may be scarce resource. Furthermore, IoT, requiring low power consumption in most cases, is also seen as a main use case for NTN.

Example embodiments of this invention focusses on paging and DRX in the case of a cell having multiple beams. Paging is a procedure to transmit paging message to the UE in RRC Idle mode or EMM registered state. Paging message may be triggered either by MME in core network or eNB in Radio Access Network.

Paging information for the UE is being carried on the PDSCH in the resource blocks indicated by the PDCCH. Paging indication on the PDCCH is single fixed indicator such as with a hexadecimal value of (FFFE) that called the Paging RNTI (P-RNTI). Different groups of UEs monitor different sub frames for their paging messages.

UEs in idle mode monitor the PDCCH channel using their P-RNTI to receive paging message from eNB. The UE needs to monitor the PDCCH only at certain UE specific paging occasion, i.e. only at specific subframe in specific radio frame. At other times the UE may go for sleep mode to save battery power.

As per 3GPP aging resources can be organized as follows (see 3GPP TS 38.304):

Paging Frame (PF): One Paging Frame (PF) is one Radio Frame in which UEs are looking for paging messages. One Paging Frame may contain one or multiple Paging Occasion(s).

Paging Occasion (PO): It is a subframe where there may be a P-RNTI transmitted on a PDCCH addressing the paging message for the UE. There is always only one paging occasion for each UE in a DRX cycle.

To find out its PF (Paging Frame) and PO (Paging Occasion), the UE uses the DRX parameters broadcasted in the system information SIB2.

When a cell has several beams, which is supported in NR, the paging cannot be done simultaneously in all beams due to hardware restrictions. At the same time for NTN this leads to an advantage in that there can be used all or a large part of the downlink power in the beam where there can be sent the paging information, thereby improving the downlink link budget and the probability of reaching the UE.

Figure 1:
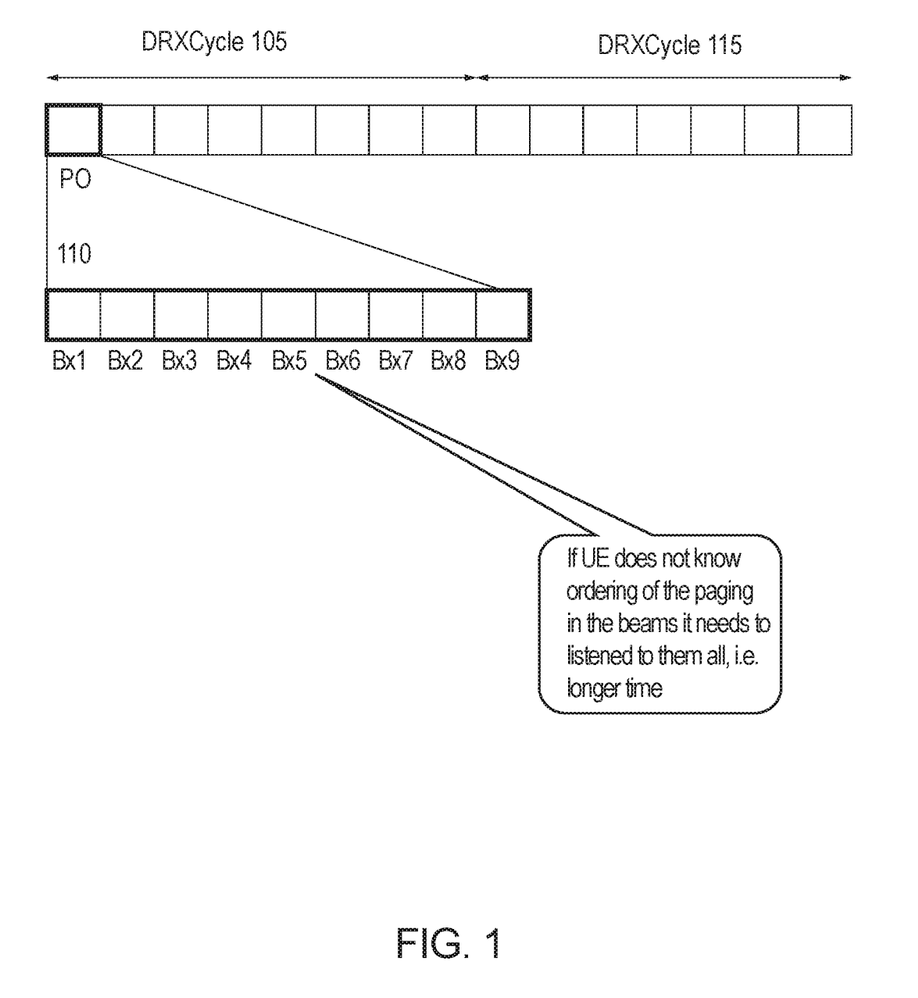
FIG. 1 shows a paging opportunity (PO) and UE forced to stay awake across all beams (beam 1 is Bx1, beam 2 Bx2, . . . )

However, at least one problem can result as the paging is not done simultaneously in all beams and the UE does not know the order of the paging per beam, the UE needs to stay longer awake as shown in FIG. 1.

As shown in FIG. 1 there is during a DRX cycle 105 a paging occasion 110 with paging for at least one of beams Bx1-Bx9. However, a problem exists in that the UE needs to stay awake for all 9 beams. The UE does not know ordering of the paging in the beams so the UE needs to listen to them all, for a longer time.

It is noted that paging as defined in 3GPP TS 38.304 V15.3.0 (2019-03) the UE may use Discontinuous Reception (DRX) in RRC_IDLE and RRC_INACTIVE state in order to reduce power consumption.

According to section 7.1 "Discontinuous Reception for Paging" of 3GPP TS 38.304 V15.3.0 (2019-03):

"The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame and may contain one or multiple PO(s) or starting point of a PO.

The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame and may contain one or multiple PO(s) or starting point of a PO.

Then, the UE initiates RRC Connection Resume procedure upon receiving RAN initiated paging. If the UE receives a CN initiated paging in RRC_INACTIVE state, the UE moves to RRC_IDLE and informs NAS.

It should be noted that in case of NTN the beams can be rather large (several 100 km), so implementing a certain paging order would seem required and still a UE will not likely be able to hear all the beams from a single satellite.

A problem tackled in accordance with example embodiments if the invention is can occur during when a UE needs to stay awake for a long time to listen for potential paging messages, and/or when a cell has several beams and the paging message is sent beam-by-beam over time. This would require prolonged listening which can lead to unnecessary UE power consumption.

In multi-beam operations, the UE can assume that the same paging message is repeated in all transmitted beams and thus the selection of the beam(s) for the reception of the paging message can be up to UE implementation. The paging message can be the same for both RAN initiated paging and CN initiated paging.

The bold part of the paragraph above is important to consider for operations in accordance with example embodiments of the invention. This is at least that in accordance with example embodiments of the invention there is assisting the UE to be able to do a power saving implementation even through network signalling of POs over multiples beams for the UE.

As stated above the specification (TS 38.304) does not specify the behaviour but simply states: "In multi-beam operations, the UE can assume that the same paging message is repeated in all transmitted beams and thus the selection of the beam(s) for the reception of the paging message is up to UE implementation" and the obvious solution is to stay awake until the UE has received the potential paging.

Example embodiments of the invention address at least these issues or problems as stated herein.

The PF and PO for paging are determined by the equation given in 38.304. According to 3GPP TS 38.304 V15.3.0 (2019-03) the PF and PO for paging may be determined by the following formulae:

SFN for the PF is determined by:

$$(SFN+PF\_offset) \bmod T = (T \operatorname{div} N)*(UE\_ID \bmod N)$$

Index (i_s), indicating the index of the PO is determined by:

$$i\_s = \operatorname{floor}(UE\_ID/N) \bmod Ns$$

At the time of this application 3GPP proposals introduce signaling of the beam order to the UE for the case of non-moving cells without a clear indication what to use it for. It is noted that there can be added additional signaling for the NTN case where cells are moving.

Example embodiments of the invention provide that propose the network node e.g., gNB inform the UE about the order of the beams being paged. This will enable the UE to only wake up when the beam it is camping on is potentially sending paging information and thus maximizing its power savings.

Figure 2:
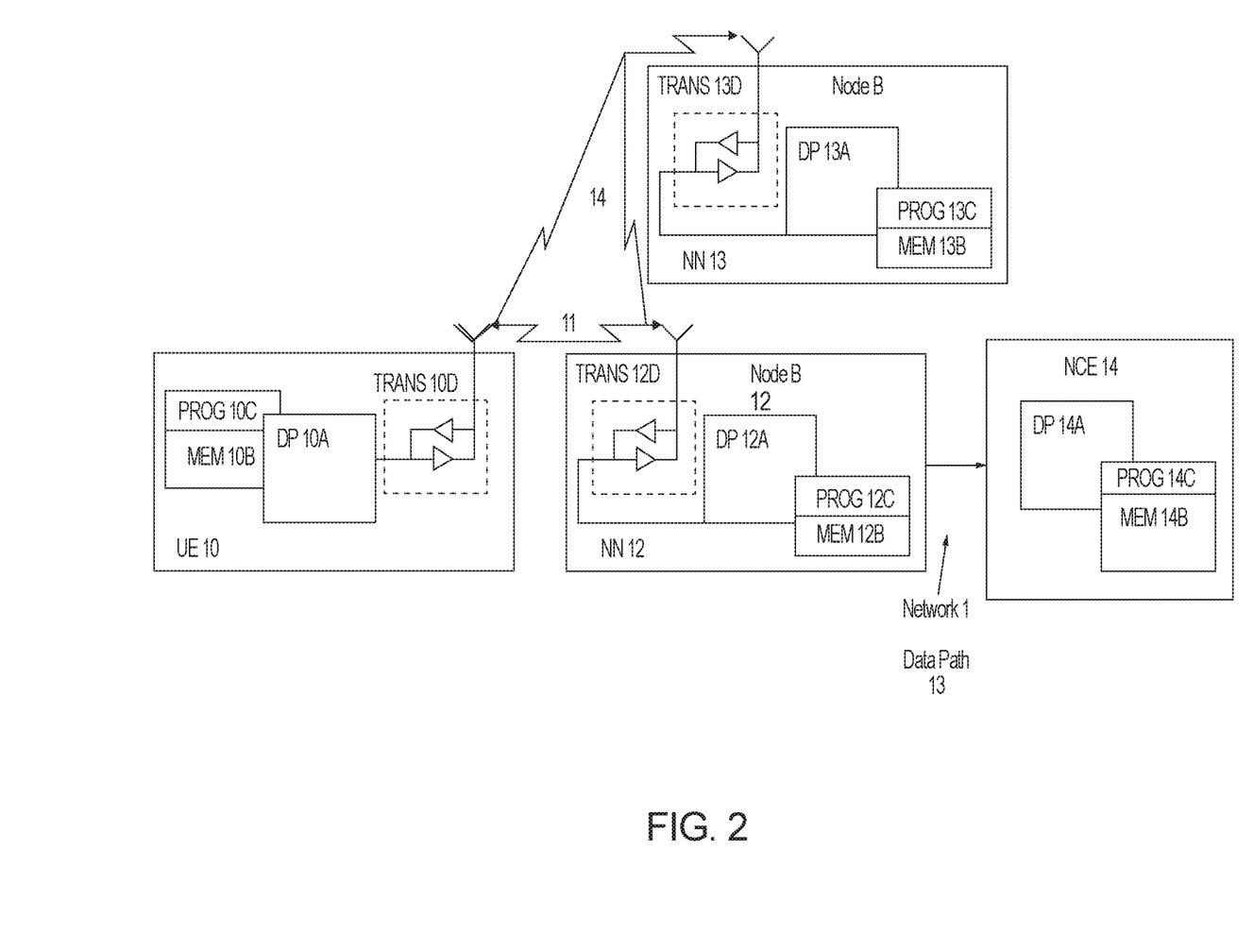
FIG. 2 shows a high level block diagram of various devices used in carrying out various aspects in accordance with example embodiments of the invention.

Before describing the example embodiments of the invention in detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 111.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 2. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices or nodes such as, but not limited to an NCE/MME/SGW device such as the NCE 14 of FIG. 2.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. These links maybe wired or wireless or both and may implement, e.g., an X2 or Xn interface. Further, as stated above the link 11 may be through other network devices or nodes such as, but not limited to an NCE/MME/SGW device such as the NCE 14 of FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 2 shows a network nodes Such as NN 12 and NN 13. Any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE) 14 that may include MME (Mobility Management Entity)/SGW (Serving Gateway) functionality, and which provides connectivity with a further network, such as a telephone network and/or a data communications network (e.g., the Internet). The NN 12 and the NN 13 are coupled via a link 13 and/or link 14 to the NCE 14. In addition, it is noted that the operations in accordance with example embodiments of the invention, as performed by the NN 13, may also be performed at the NCE 14.

The NCE 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

It is noted that with example embodiments of the invention can be used to improve at least one 3GPP proposal introducing signaling of the beam order to the UE for the case of non-moving cells. This is for at least the reason that this 3GPP proposal does not provide a clear indication what to use it for. Furthermore, example embodiments of the invention provide additional signaling which can be used such as for an NTN case where cells or satellites are moving.

In accordance with example embodiments a network node for performing operations in accordance with example embodiments of the invention may be collocated in at least one satellite or orbiting device that can be moving.

Figure 3:
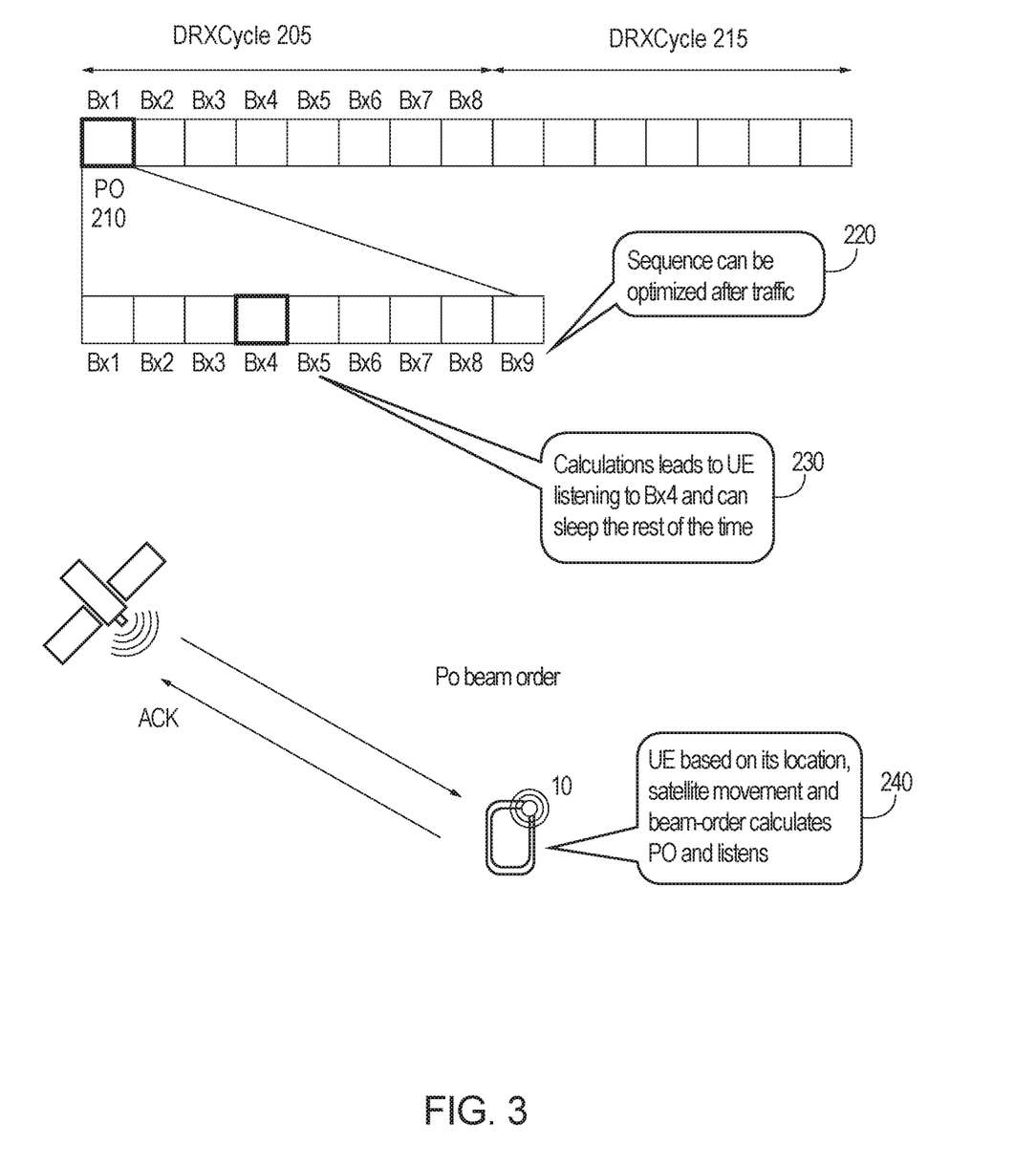
FIG. 3 shows paging with several beams per cell optimised for battery savings in accordance with example embodiments of in accordance with example embodiments of the invention.

FIG. 3 shows paging with several beams per cell optimised for battery savings in accordance with example embodiments of the invention. As shown in FIG. 3 there is DRX cycle 205 followed by DRX cycle 215. As shown in FIG. 3, during DRX cycle 205 there is paging occasion (PO) 210. In accordance with example embodiments of the invention as shown in FIG. 3 the UE 10 is able to determine with calculations, such as beam order calculations, using information from a network node that its PO is during beam Bx4 of the PO 210 sequence as provided from the network node. As shown in item 220 of FIG. 3 in accordance with example embodiments of the invention this sequence can be optimized after traffic. Further, as shown in item 230 of FIG. 3 the calculations lead the UE 10 to listen to only beam Bx4 of PO 210 while remaining asleep at other times during the DRX cycle 205. Further, in accordance with example embodiments of the invention as shown in item 240 of FIG. 3 the UE can base its calculations including the beam order calculations on information, such as from the network node, which enables the UE to determine its location, satellite movements for the beams, and the beam order for its listening operations.

Operations in accordance with example embodiments of the invention can include determining a time and/or beam for at least one Paging Time Window for a specific UE, such as the UE 10 of FIG. 2. Such a Paging Time Window can be used to identify a time and/or beam for a PO for a specific UE in the DRX or eDRX mode to monitor for the PO. The Paging Time Window with a PO for a specific UE can be identified during occasions around a DRX cycle or eDRX cycle representing an individual time interval between monitoring Paging Occasion for different UEs.

The determining, in accordance with example embodiments of the invention, includes determining times and/or beams of a PO for a UE around or during a DRX cycle or an eDRX cycle or during time intervals between the Paging Occasions occurring after successive extended DRX periods. Further, operations in accordance with example embodiments of the invention can be used to identify time and communication beams with at least one PO for a specific UE during an eDRX cycle where time intervals between the Paging Occasions occurring after successive extended DRX periods.

In more detail example embodiments of the invention as described herein can works as follows:

The network informs the UE on the order of the beams being paged. In the example it simply is using 1,2,3, 4,5,6,7,8,9, but the optimizations described in the next section are possible; and The UE knows the PO, based on its P-RNTI, and with the knowledge of The beam-order received from the network Now in the case of NTN the beams are moving, as the satellites move (LEO satellites assumed). So a certain location a UE is in can be covered by different beams in time. In accordance with example embodiments of the invention there is proposed signalling from the network to the UE identifying differing times and beams of a PO for the UE.

Figure 4:
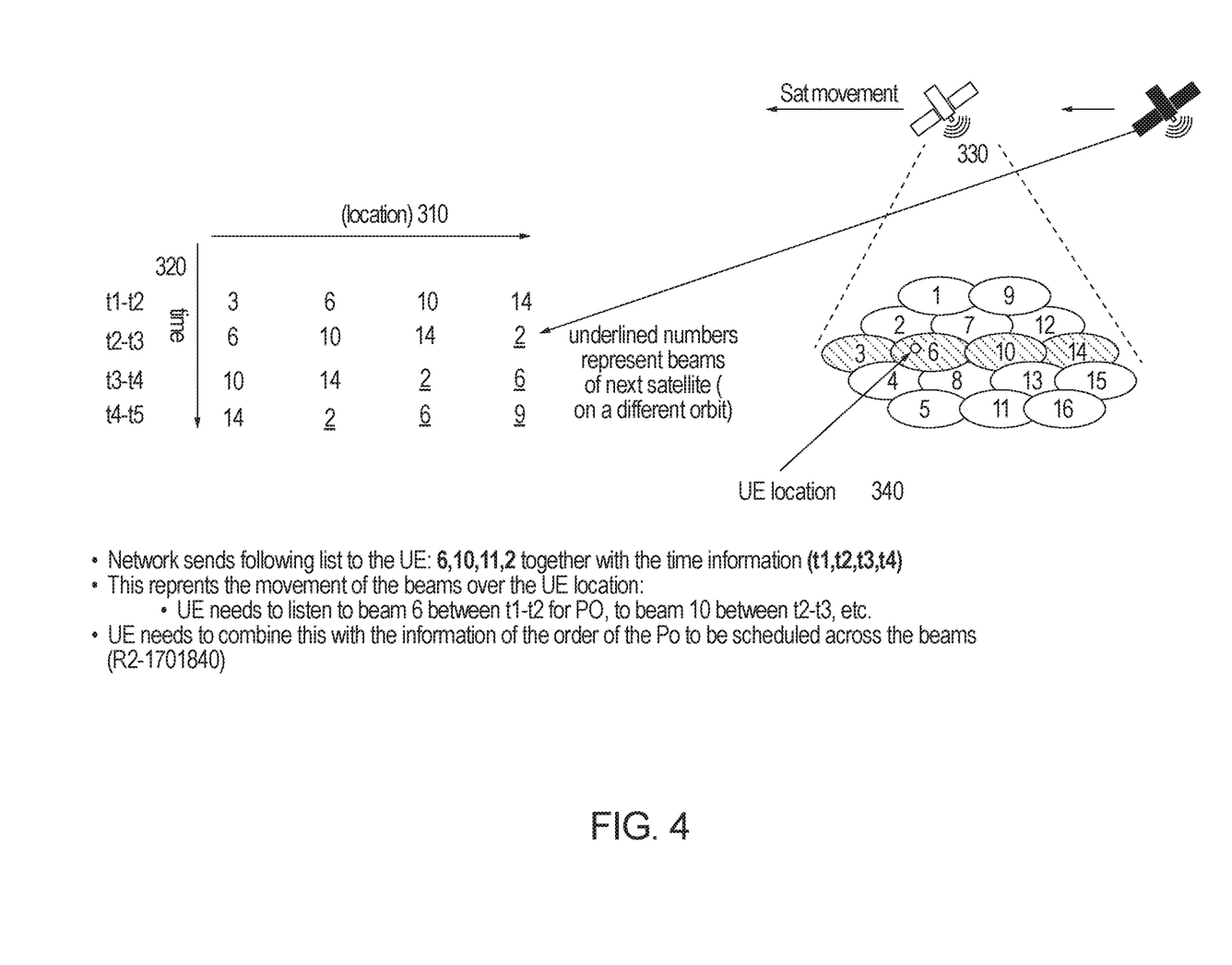
FIG. 4 shows illustration of an idea of signaling in accordance with example embodiments of the invention.

This is illustrated in FIG. 4. FIG. 4 shows an illustration of an idea of signalling in accordance with example embodiments of the invention.

As shown in FIG. 4 there is a matrix representative of calculations based on PO information provided to a UE. The matrix is based on location 310 and time 320 and is an illustration of what can be determined based on information of satellite movements 330 and a UE location 340 as determined by the UE in response to the information from the network node as described herein in accordance with example embodiments of the invention. As shown in the matrix of FIG. 4 the underlined number represent beams of a next satellite, possibly of a different orbit.

Regarding FIG. 4:

The matrix shows which beams are covering which location (on the 2D axis in the middle of the coverage of the satellite on the right) at what time (as the satellite moves, the coverage on earth moves); and Assuming the UE to be fixed and that means that the bold numbers as shown in FIG. 4 are the beams the UE needs to listen to (for PO) at the different time instances;

The underlined numbers are the beams from the next satellite coming in at some point. Satellite movements are deterministic so this can be calculated; and The UE now knows what beam to listen to at what time. Now it needs to know when the PO is send per beam from the GNB. With this information it can maximize battery savings.

In accordance with example embodiments of the invention a network node, such as the NN 13 and/or NN 12 as in FIG. 2, can create the matrix based on determined locations in time of user equipment, such as the UE 10 as in FIG.2, during paging occasions associated with at least one communication beam of a communication network. In accordance with the embodiments the network node can send the information or the matrix to the UE so that it knows which beam and which time a PO for it is to be received.

Also the case when the UE is moving is covered as if the UE moves significantly (please note the beams from satellites can be most large). This can be such that the network can fall back for its paging to a UE to paging multiple beams when that UE does not answer on the paging. In this case the information, in accordance with an example embodiment of the invention, as determined by the network node, such as the NN 13 and/or NN 12 as in FIG. 2, can include indications of locations in time of the UE and the more than one communication beam associated with at least one PO for the UE during the locations in time of user equipment.

Furthermore, it is noted that in accordance with the example embodiments the network or network node can switch this feature off and not provide any order in case there are no UEs in its coverage area requiring extreme power savings.

To further clarify, one novel operations in accordance with example embodiments of the invention includes that the network or a network node define a specific beam sweep sequence for paging and informs relevant UEs about it.

Example embodiments of the invention work to provide enhancements on a network side and a UE side at least as follows:

Network side:

The network side needs to establish the order of the paging occasions across the beams. It can use as input an estimate of the number of UEs, which require power savings per beam, i.e. if a certain beam does not have any UEs requiring power savings (like for NTN an beam covering a part of the ocean), whereas another beam has a lot of idle UEs camping (like for NTN a village in the desert), it can transmit the beam with UEs more often than the one without, so there can be beams without PO, whereas others may have more frequent PO;

The network needs to inform/broadcast the order of the beams used, such the UEs have this information; and The network needs to inform the order of the beams covering the location of the UE in time.

UE side:

The UE receives the order of paging over the different beams by the two informed orders;

The UE establishes in which beam a PO for it is, of its own location and the location of the network/gNB. This information based at least on knowledge the UE or network device determines or knowledge gained from information received from a network node; and Only wake up during the PO when the relevant beam or beams is/are being sent, and thus containing the potential UE paging. This can be achieved by implementing a calculation which has as input:

Knowledge of the paging pattern over the beams (i.e. beam order)

Knowledge of satellite movement and beam coverage knowledge of the current beam (and potentially future beams)

Figure 5A:
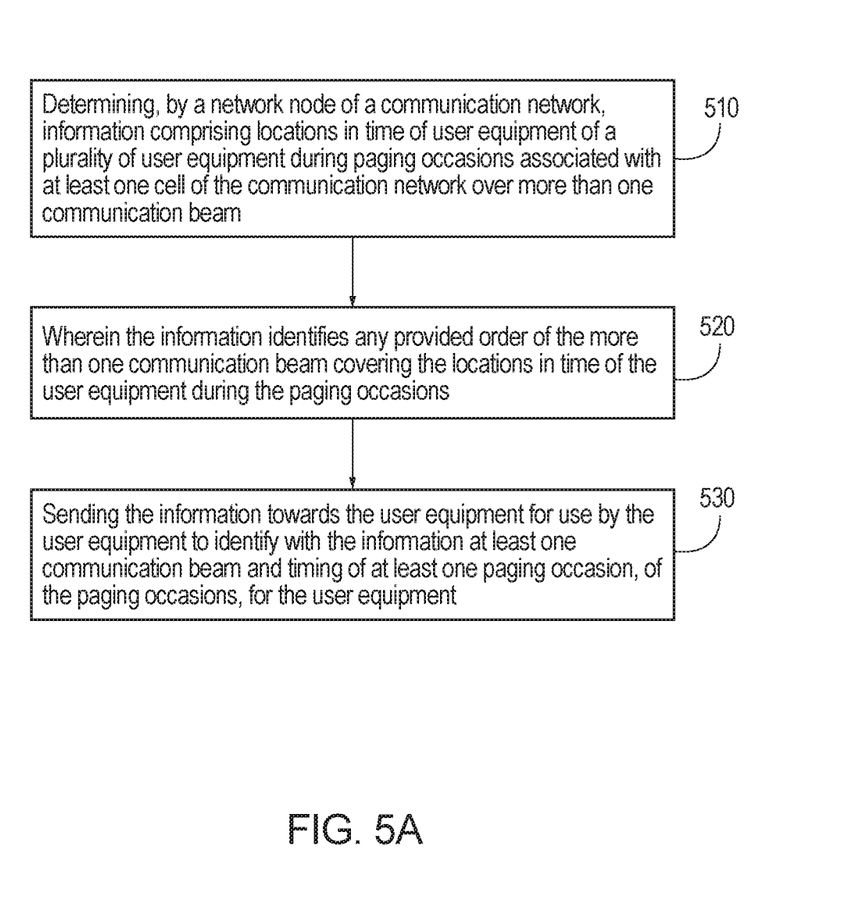
FIG. 5A and FIG. 5B each show a method in accordance with example embodiments of the invention which may be performed by an apparatus.

FIG. 5A illustrates operations which may be performed by a device such as, but not limited to, a device associated with the UE 10, NN 12, and/or NN 13 as in FIG. 2. As shown in step 510 of FIG. 5A there is determining, by a network node of a communication network, information comprising locations in time of user equipment of a plurality of user equipment during paging occasions associated with at least one cell of the communication network over more than one communication beam. As shown step 520 of FIG. 5A wherein the information identifies any provided order of the more than one communication beam covering the locations in time of the user equipment during the paging occasions. Then as shown in step 530 of FIG. 5A there is sending the information towards the user equipment for use by the user equipment to identify with the information at least one communication beam and timing of at least one paging occasion, of the paging occasions, for the user equipment.

In the example aspect of the invention according to the paragraph above, wherein the information is one of broadcast towards the user equipment or sent via dedicated signaling or multicast to the user equipment.

In the example aspect of the invention according to the paragraphs above, wherein the information comprises a list of beams associated with the paging occasions for use by the user equipment.

In the example aspect of the invention according to the paragraphs above, wherein the information comprises an indication of movement of the more than one communication beam associated with the paging occasions during the locations in time of user equipment.

In the example aspect of the invention according to the paragraphs above, wherein the indication is using a matrix associated with the locations in time of user equipment.

In the example aspect of the invention according to the paragraphs above, wherein the information is for use by the user equipment to determine the least one paging occasion to leave a power saving mode to receive the at least one paging occasion of the paging occasions associated with the at least one cell over the more than one communication beam.

In the example aspect of the invention according to the paragraphs above, wherein the information comprises an indication of at least one of a communication beam current for the user equipment at a time of the at least one paging occasion.

In the example aspect of the invention according to the paragraphs above, wherein the determining is based on an estimated number of the plurality of user equipment which require power savings during the order in time of the at least one communication beam.

In the example aspect of the invention according to the paragraphs above, wherein the network node is embodied in a satellite of at least one satellite, wherein at least one communication beam is associated with a non-terrestrial network supported by the at least one satellite.

In the example aspect of the invention according to the paragraphs above, wherein for a case where there is no provided order of the more than one communication beam the information is not identifying an order of the more than one communication beam during the paging occasions to cause the user equipment to identify that the paging occasions can use any of the more than one communication beam.

In the example aspect of the invention according to the paragraphs above, wherein for a case the determined locations in time of user equipment indicate that movement of the user equipment has exceeded a threshold, the information causes the user equipment to identify that the paging occasions can use any of the more than one communication beam.

A non-transitory computer-readable medium (MEM 12B and/or MEM 13B and/or MEM 10B as in FIG. 2) storing program code (PROG 12C and/or PROG 13C and/or PROG 10C as in FIG. 2), the program code executed by at least one processor (DP 12A and/or DP 13A and/or DP 10A as in FIG. 2) to perform the operations as at least described in the paragraphs above.

In accordance with an example embodiment of the invention as described above there is an apparatus comprising: means for determining (MEM 13B and/or MEM 12B and/or MEM 10B storing PROG 13C and/or PROG 12C and/or PROG 10C executed by DP 13A and/or DP 12A and/or DP 10A as in FIG. 2), by a network node (NN 13 and/or NN 12 as in FIG. 2) of a communication network, information comprising locations in time of user equipment (UE 10 as in FIG. 2) of a plurality of user equipment during paging occasions associated with at least one cell of the communication network (network 1 as in FIG. 2) over more than one communication beam, wherein the information is associated with means for identifying (MEM 13B and/or MEM 12B and/or MEM 10B storing PROG 13C and/or PROG 12C and/or PROG 10C executed by DP 13A and/or DP 12A and/or DP 10A as in FIG. 2) any provided order of the more than one communication beam covering the locations in time of the user equipment during the paging occasions, and means for sending (TRANS 13D and/or TRANS 12D and/or TRANS 10D and MEM 13B and/or MEM 12B and/or MEM 10B storing PROG 13C and/or PROG 12C and/or PROG 10C executed by DP 13A and/or DP 12A and/or DP 10A as in FIG. 2) the information towards the user equipment for use by the user equipment to identify with the information at least one communication beam and timing of at least one paging occasion, of the paging occasions, for the user equipment.

In the example aspect of the invention according to the paragraph above, wherein at least the means for determining, means for identifying, and means for sending comprises transceiver [TRANS 13D and/or TRANS 12D and/or TRANS 10D as in FIG. 2] a non-transitory computer readable medium [MEM 13B and/or MEM 12B and/or MEM 10B] encoded with a computer program [PROG 13C and/or PROG 12C and/or PROG 10C] executable by at least one processor [DP 13A and/or DP 12A and/or DP 10A as in FIG. 2].

Figure 5B:
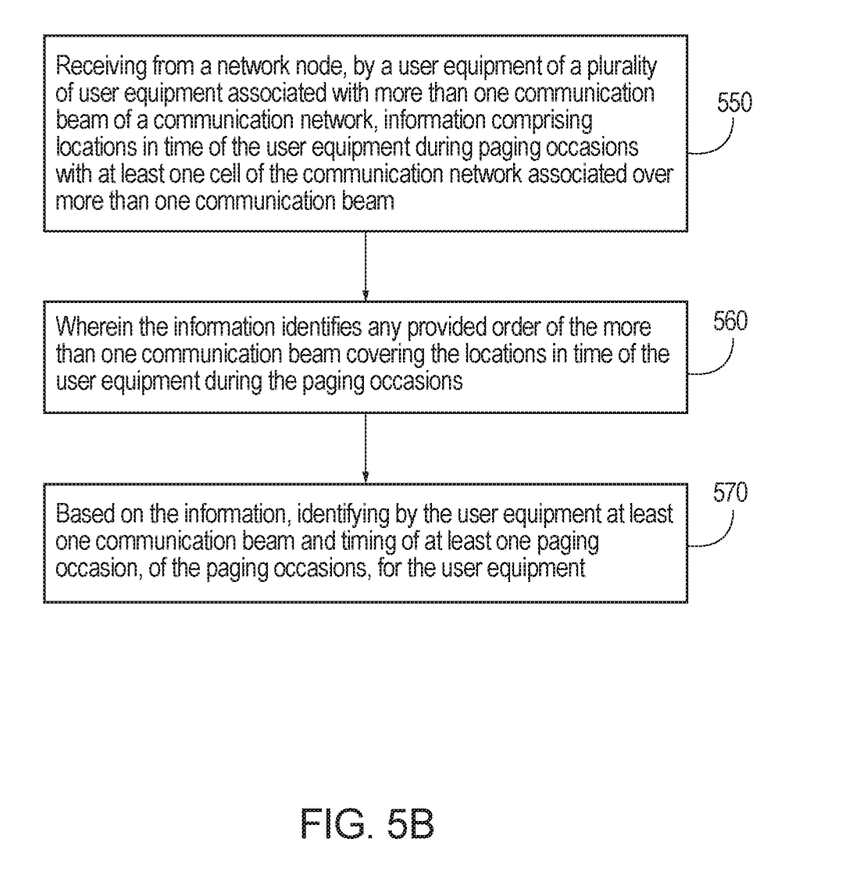

FIG. 5B illustrates operations which may be performed by a device such as, but not limited to, a device associated with the UE 10, NN 12, and/or NN 13 as in FIG. 2. As shown in step 550 of FIG. 5B there is receiving from a network node, by a user equipment of a plurality of user equipment associated with more than one communication beam of a communication network, information comprising locations in time of the user equipment during paging occasions with at least one cell of the communication network associated over more than one communication beam. As shown in step 560 of FIG. 5B wherein the information identifies any provided order of the more than one communication beam covering the locations in time of the user equipment during the paging occasions. Then as shown in step 570 of FIG. 5B there is, based on the information, identifying by the user equipment at least one communication beam and timing of at least one paging occasion, of the paging occasions, for the user equipment.

In the example aspect of the invention according to the paragraph above, wherein the information is received via one of a broadcast communication or dedicated signaling or multicast signaling.

In the example aspect of the invention according to the paragraphs above, wherein the information comprises a list of beams associated with the paging occasions for use by the user equipment.

In the example aspect of the invention according to the paragraphs above, wherein the information comprises an indication of movement of the more than one communication beam associated with the paging occasions during the locations in the time of user equipment.

In the example aspect of the invention according to the paragraphs above, wherein the indication is using a matrix associated with the locations in the time of user equipment.

In the example aspect of the invention according to the paragraphs above, wherein the information is for use by the user equipment to determine a power saving mode to leave to receive the at least one paging occasion of the paging occasions associated with the at least one cell over the more than one communication beam.

In the example aspect of the invention according to the paragraphs above, wherein the information comprises an indication of a communication beam current for the user equipment at the time of the user equipment during the paging occasions.

In the example aspect of the invention according to the paragraphs above, wherein the information is based on an estimated number of the plurality of user equipment which require power savings during the paging occasions.

In the example aspect of the invention according to the paragraphs above, wherein at least one communication beam is associated with a non-terrestrial network supported by the at least one satellite.

In the example aspect of the invention according to the paragraphs above, wherein for a case where there is no provided order of the more than one communication beam the information is not identifying an order of the more than one communication beam during the paging occasions to cause the user equipment to identify that the paging occasions can use any of the more than one communication beam.

In the example aspect of the invention according to the paragraphs above, wherein for a case the locations in time of user equipment indicate that movement of the user equipment has exceeded a threshold, the information causes the user equipment to identify that the paging occasions can use any of the more than one communication beam.

A non-transitory computer-readable medium (MEM 12B and/or MEM 13B and/or MEM 10B as in FIG. 2) storing program code (PROG 12C and/or PROG 13C and/or PROG 10C as in FIG. 2), the program code executed by at least one processor (DP 12A and/or DP 13A and/or DP 10A as in FIG. 2) to perform the operations as at least described in the paragraphs above.

In accordance with an example embodiment of the invention as described above there is an apparatus comprising: means for receiving (TRANS 13D and/or TRANS 12D and/or TRANS 10D and MEM 13B and/or MEM 12B and/or MEM 10B storing PROG 13C and/or PROG 12C and/or PROG 10C executed by DP 13A and/or DP 12A and/or DP 10A as in FIG. 2) from a network node (NN 13 and/or NN 12 as in FIG. 2), by a user equipment (UE 10 as in FIG. 2) of a plurality of user equipment associated with more than one communication beam of a communication network (Network 1 as in FIG. 2), information comprising locations in time of the user equipment during paging occasions with at least one cell of the communication network associated over more than one communication beam, wherein the information is associated with means for identifying (MEM 13B and/or MEM 12B and/or MEM 10B storing PROG 13C and/or PROG 12C and/or PROG 10C executed by DP 13A and/or DP 12A and/or DP 10A as in FIG. 2) any provided order of the more than one communication beam covering the locations in time of the user equipment during the paging occasions; and means, based on the information, for identifying (TRANS 13D and/or TRANS 12D and/or TRANS 10D and MEM 13B and/or MEM 12B and/or MEM 10B storing PROG 13C and/or PROG 12C and/or PROG 10C executed by DP 13A and/or DP 12A and/or DP 10A as in FIG. 2) by the user equipment at least one communication beam and timing of at least one paging occasion, of the paging occasions, for the user equipment It is noted that advantages in accordance with the example embodiments of the invention include at least:

Improved power savings; and

Higher probability to page UEs fast, because the beams, which contain UEs, may be transmitted more often In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although example embodiments of the invention are not limited thereto. While various aspects of in accordance with example embodiments of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out example embodiments of the invention. However, various modifications and adaptations may become apparent to those skilled in the relevant arts in view of the foregoing description, when read in conjunction with the accompanying drawings and the appended claims. However, all such and similar modifications of the teachings of example embodiments of the invention will still fall within the scope of this invention.

It should be noted that the terms "connected," "coupled," or any variant thereof, mean 30 any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   receiving from a network node, by a user equipment of a plurality of user equipment associated with more than one communication beam of a communication network, information comprising locations in time of the user equipment during paging occasions with at least one cell of the communication network associated over more than one communication beam,
   wherein the information identifies any provided order of the more than one communication beam covering the locations in time of the user equipment during the paging occasions; and
   based on the information, identifying by the user equipment at least one communication beam and timing of at least one paging occasion, of the paging occasions, for the user equipment;
   wherein the information is for use by the user equipment to determine a power saving mode to leave to receive the at least one paging occasion of the paging occasions associated with the at least one cell over the more than one communication beam.

2. The method of claim 1, wherein the information comprises a list of beams associated with the paging occasions for use by the user equipment.

3. The method of claim 1, wherein the information comprises an indication of movement of the more than one communication beam associated with the paging occasions during the locations in the time of the user equipment.

4. The method of claim 3, wherein the indication is using a matrix associated with the locations in the time of the user equipment.

5. The method of claim 1, wherein the information comprises an indication of a communication beam current for the user equipment at the time of the user equipment during the paging occasions.

6. The method of claim 1, wherein for a case the locations in time of the user equipment indicate that movement of the user equipment has exceeded a threshold, the information causes the user equipment to identify that the paging occasions can use any of the more than one communication beam.

7. An apparatus comprising:
   at least one processor; and
   at least one memory including computer program code, where the at least one memory and the computer program code are configured, with the at least one processor, to cause the apparatus to at least:
   receive from a network node, by the apparatus of a plurality of user equipment associated with more than one communication beam of a communication network, information comprising locations in time of the apparatus during paging occasions with at least one cell of the communication network associated over more than one communication beam,
   wherein the information identifies any provided order of the more than one communication beam covering the locations in time of the apparatus during the paging occasions; and
   based on the information, identify at least one communication beam and timing of at least one paging occasion of the paging occasions,
   wherein the information is to determine a power saving mode to leave to receive the at least one paging occasion of the paging occasions associated with the at least one cell over the more than one communication beam.

8. The apparatus of claim 7, wherein the information comprises a list of beams associated with the paging occasions for use by the apparatus.

9. The apparatus of claim 7, wherein the information comprises an indication of movement of the more than one communication beam associated with the paging occasions during the locations in the time of the apparatus.

10. The apparatus of claim 9, wherein the indication is using a matrix associated with the locations in the time of the apparatus.

11. The apparatus of claim 7, wherein the information comprises an indication of a communication beam current for the apparatus at the time of the apparatus during the paging occasions.

12. The apparatus of claim 7, wherein the information is based on an estimated number of the plurality of user equipment which require power savings during the paging occasions.

13. The apparatus of claim 7, wherein at least one communication beam is associated with a non-terrestrial network supported by at least one satellite.

14. An apparatus comprising: at least one processor; and
   at least one memory including computer program code, where the at least one memory and the computer program code are configured, with the at least one processor, to cause the apparatus to at least:
   determine, by the apparatus in a communication network, information comprising locations in time of a user equipment of a plurality of user equipment during paging occasions associated with at least one cell of the communication network over more than one communication beam,
   wherein the information identifies any provided order of the more than one communication beam covering the locations in time of the user equipment during the paging occasions; and
   send the information towards the user equipment for use by the user equipment to identify with the information at least one communication beam and timing of at least one paging occasion, of the paging occasions, for the user equipment;
   wherein the determining is based on an estimated number of the plurality of user equipment which require power savings during the order in time of the at least one communication beam.

15. The apparatus of claim 14, wherein the information comprises a list of beams associated with the paging occasions for use by the user equipment.

16. The apparatus of claim 14, wherein the information comprises an indication of movement of the more than one communication beam associated with the paging occasions during the locations in time of the user equipment.

17. The apparatus of claim 14, wherein the apparatus is embodied in a satellite of at least one satellite, wherein the at least one communication beam is associated with a non-terrestrial network supported by the at least one satellite.

\* \* \* \* \*